(12) United States Patent
Detampel

(10) Patent No.: US 6,634,582 B2
(45) Date of Patent: Oct. 21, 2003

(54) ROLLER-TYPE REDUCING APPARATUS

(75) Inventor: Hans Detampel, Berlin (DE)

(73) Assignee: RECOM Patent & License, GmbH, Berlin (DE)

( * ) Notice: Subject to any disclaimer, the term of this patent is extended or adjusted under 35 U.S.C. 154(b) by 0 days.

(21) Appl. No.: 10/020,727

(22) Filed: Oct. 22, 2001

(65) Prior Publication Data

US 2002/0128128 A1 Sep. 12, 2002

(30) Foreign Application Priority Data

Oct. 21, 2000 (DE) .......................................... 100 52 357

(51) Int. Cl.[7] ................................................ B02C 4/08
(52) U.S. Cl. ...................................... 241/236; 241/293
(58) Field of Search ................................ 241/227, 236, 241/293, 294, 295, 100

(56) References Cited

U.S. PATENT DOCUMENTS

| 4,627,581 A | * | 12/1986 | Holiman et al. | ............. 241/167 |
| 4,961,540 A | * | 10/1990 | Wiesemann | ................... 241/236 |
| 5,048,764 A | * | 9/1991 | Flament | ....................... 241/222 |
| 5,678,774 A | * | 10/1997 | Bennett et al. | ........ 241/186.35 |
| 5,927,627 A | * | 7/1999 | Edson et al. | ................. 241/159 |

* cited by examiner

Primary Examiner—John M. Husar
(74) Attorney, Agent, or Firm—Jenner & Block, L.L.C.

(57) ABSTRACT

A roller-type reducing apparatus comprising reducing rollers mounted within a housing for rotation in opposite directions. The reducing rollers comprise a plurality of reducing discs having different diameters and placed in a side-by-side relationship. There are provided reducing discs with fine serrations and reducing discs with coarse serrations, with comminuting discs with fine serrations having a diameter smaller than that of reducing discs with coarse serrations.

7 Claims, 3 Drawing Sheets

ROLLER-TYPE REDUCING APPARATUS

BACKGROUND OF THE INVENTION

1. Field of the Invention

The present invention relates to roller-type reducing apparatus comprising reducing rollers mounted within a housing and adapted to be rotated in opposite directions.

2. Description of the Related Art

Roller-type size reducing apparatus of the inventive kind is used for processing brittle low-abrasion materials, preferably deep-freeze embrittled spent tire fragments, industrial rubber product waste as well as plastics-metal/fiber composites.

Spent motor vehicle tires constitute a rich source of raw materials. In the prior cryogenic process, the rubber of such tires is supposed to be granulated in the embrittled condition for conversion into a reusable secondary raw material which can be returned to production processes.

The rubber granulates and rubber crumbs obtainable in prior cryogenic shredding and reducing plants have turned out to have properties which make them unsuitable for processing and recycling. The granules are too big; they contain excessive amounts of foreign materials that cannot be separated from them any longer—such as steel reinforcements or textile fibers—and are non-uniform in consistency. Scrap rubber of this nature is not suited for large-scale recycling and raises considerable technical problems.

SUMMARY OF THE INVENTION

The object of the present invention is to provide for reducing of the type initially described which enables brittle low-abrasion materials—preferably cryogenically embrittled scrap rubber—to be processed into granulates and powders having a uniform consistency.

This object is attained by using reducing rollers each comprising a plurality of reducing discs placed side by side and having different diameters. In another embodiment, the reducing rollers each comprise a plurality of reducing discs placed side by side and having different diameters and peripheral serrations.

Further, the above object is attained by means of roller-type reducing assembly comprising reducing rollers mounted within a housing for rotation in opposite directions, such rollers comprising differently serrated discs of different diameters and mounted in alternating fashion on associated shafts in such a manner that large-diameter discs of one roller face the small-diameter discs of the other roller.

In addition, the finely serrated reducing discs are provided to have a smaller diameter than the larger-diameter reducing discs.

The aforesaid measures result in roller-type reducing assembly suited for reducing embrittled scrap rubber into rubber granulate and rubber powder. By its design and the materials used for its fabrication, the inventive apparatus will support the special loads and stresses occurring in low-temperature operation at approximately 100° C. below freezing.

The rubber component is reduced into a granulate having a relatively uniform granule structure. Most of the fiber and steel component remains in an unreduced condition so that they are easily separated.

The reducing assembly has a closed-loop speed-regulated drive so that the reduction process can be matched closely to the quality of the scrap rubber to be processed. As the reducing gap is variable in width, it is possible to produce a rubber granulate which has a predetermined granule size, granule surface and granule structure. The speeds of the oppositely rotating rollers can be varied independently.

The entire reducing system is arranged for rapid and easy repair and maintenance. To this end, stationary relocating means are provided for relocating the machine components from an operating position to a servicing position using a small number of manual operations. Hoists installed above the servicing position are provided to facilitate necessary repairs.

The reducers are thermally and sound-insulated. In its entirety, the system is encapsulated for operation in a substantially dust-free manner.

Additional advantageous measures are described in the dependent claims. The invention is illustrated in the attached drawings and is described in greater detail below.

DETAILED DESCRIPTION OF THE INVENTION

Figure 1:
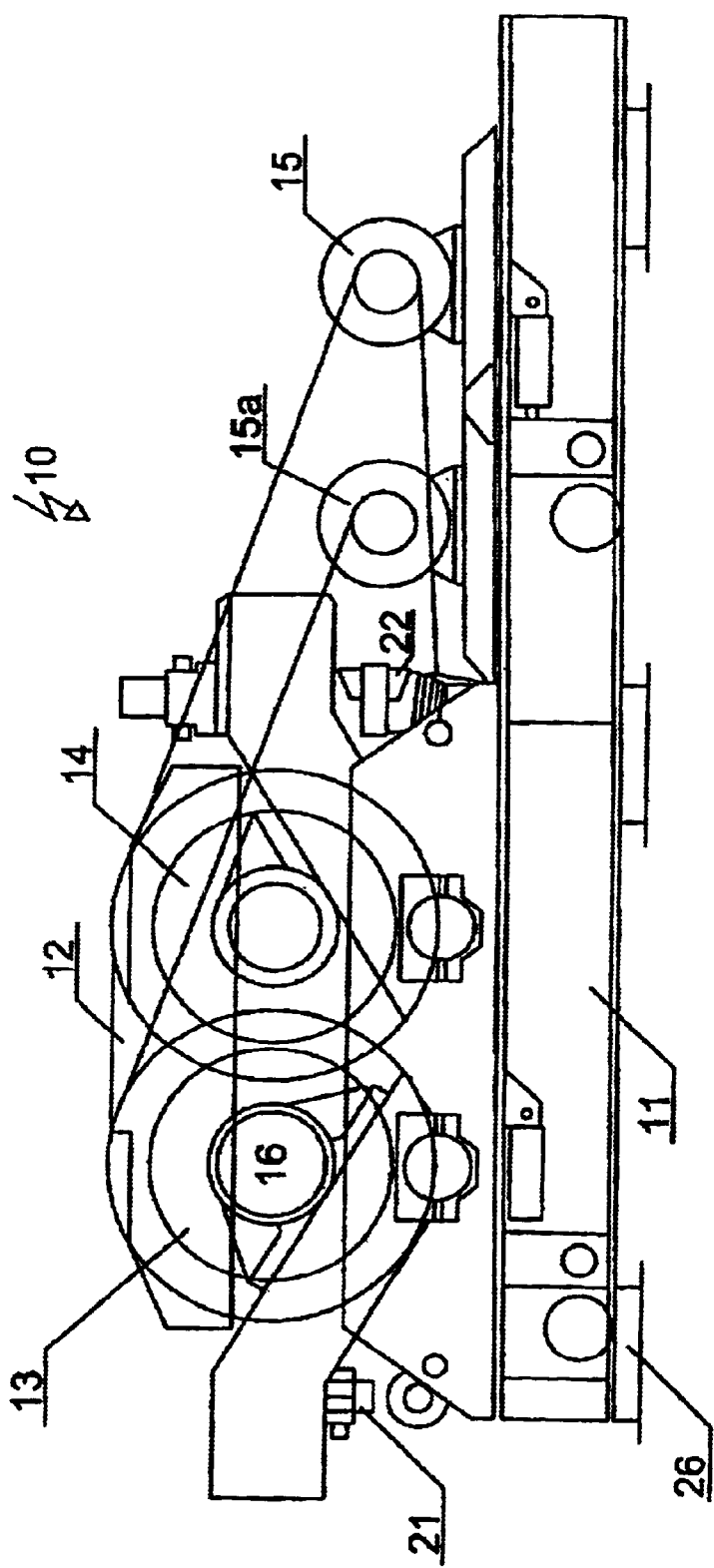
FIG. 1 is a section view of roller-type reducing assembly comprising two oppositely rotatable reducing rollers consisting of integrally joined and differently serrated reducing discs.

As shown in FIG. 1, roller-type reducing assembly 10 essentially comprises a base frame 11 having a housing 12 thereon. Housing 12 accommodates two oppositely rotatable reducing roller 13 and 14 mounted for rotation on reducing roller bearings 16.

Reducing rollers 13 and 14 are driven by reducing roller drives 15 and 15a and supported by reducing roller spring assembly 22.

Figure 2:
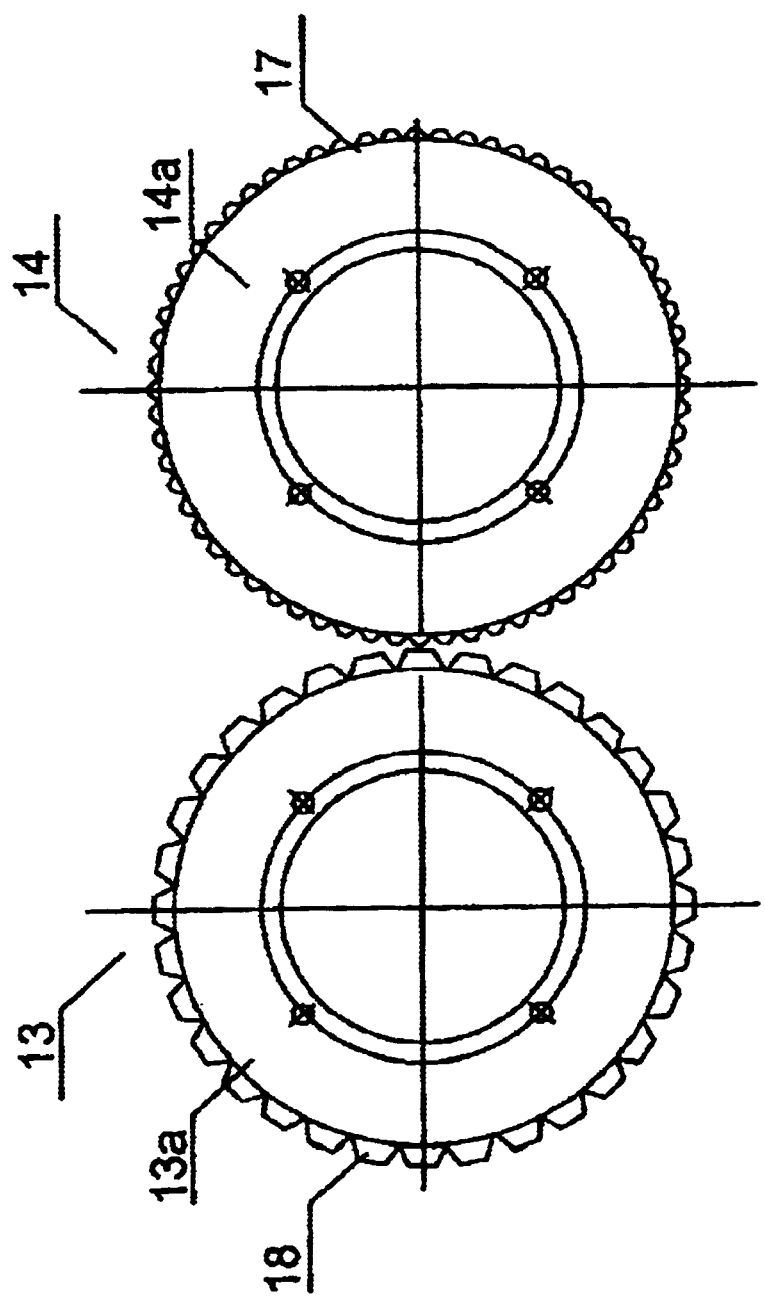
FIG. 2 is a section view of a finely serrated reducing disc and of a coarsely serrated reducing disc as well as the details of a reducing disc assembly according to FIG. 1.
Figure 3:
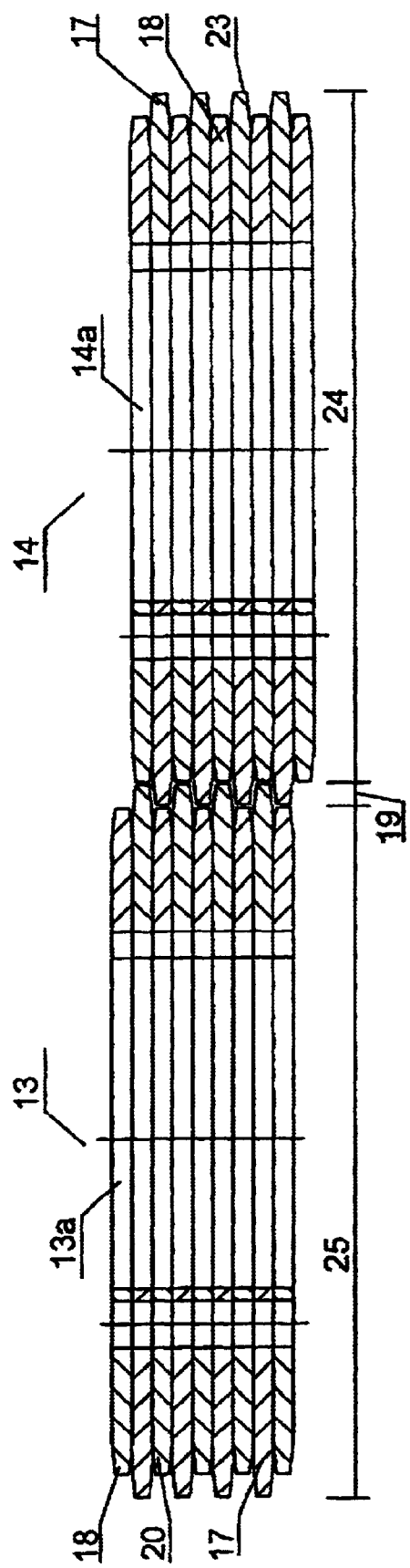
FIG. 3 is a plan view of the reducing disc assembly according to FIG. 2.

As shown in FIGS. 2 and 3, reducing rollers 13 and 14 each consist of a plurality of reducing discs 13a and 14a placed on common shafts 27 and 27a, respectively.

Reducing discs 13a have a smaller diameter 25 while reducing discs 14a have a somewhat greater diameter 24. Reducing discs 13a, 14a are integrally joined, with smaller-diameter reducing discs 13a offset from greater-diameter reducing discs 14a by an offset 20.

On their radially outer surfaces, greater-diameter reducing discs 14a have coarse peripheral serrations 17 and smaller-diameter reducing discs 13a have fine peripheral serrations 18. Each one of reducing rollers 13, 14 comprises a plurality of smaller-diameter reducing discs 13a with fine serrations 18 and a plurality of greater-diameter reducing discs 14a with coarse serrations 17, the aforesaid discs being provided in an alternating relationship and being integrally joined to each other.

There is provided between reducing rollers 13 and 14 a reducing gap 19, which is made to be variable by reducing gap width adjusting means 21 shown in FIG. 1.

Offset 20 causes each greater-diameter reducing disc 14a having coarse serrations 17 to be placed face to face with a smaller-diameter reducing disc 13a having fine serrations 18. Said serrations 17 and 18 are provided on the radially outer surfaces of the respective reducing discs 14a, 13a and have axial tapers 23 on both sides.

Tapers 23 impart to the reducing gap 19 a zigzag configuration with a trapezoidal shape in plan view. This arrangement results in the reduction of cryogenically embrittled scrap rubber into granules having the flaky surface structure needed for further processing. A liquid deep-freeze coolant—preferably liquid nitrogen—having a temperature of approximately 190° K may be injected in housing 12 while reduction is in progress.

Relocating means 26 allows reducing assembly 10 to be moved easily from an operating position to a servicing position. Any necessary repairs are facilitated by hoisting means (not shown) mounted above the servicing position. Reducing assembly 10 is encapsulated in housing 12 for thermal and noise insulation and substantially dust-free operation.

Thus, there has been disclosed a roller-type reducing apparatus with reducing rollers mounted within a housing for rotation in opposite directions. The reducing rollers are comprised of a plurality of reducing discs, the discs having different diameters. The discs also have different sized serrations for assisting in sorting scrap rubber.

Whereas the present invention has been described with respect to specific embodiments thereof, it will be understood that various changes and modifications will be suggested to one of ordinary skill in the art, and it is intended that the invention encompass such changes and modifications as fall within the scope of the appended claims.

What is claimed is:

1. A roller-type reducing apparatus (10) comprising reducing rollers (13, 14) mounted within a housing (1) for rotation in opposite directions, said rollers comprising differently serrated reducing discs (13a, 14a) having different diameters and mounted alternatingly on a common shaft (27, 27a) in such a manner that each greater-diameter reducing disc (14a) of one reducing roller (14) corresponds to a smaller-diameter reducing disc (13a) of another reducing roller (13), wherein the smaller diameter reducing discs (13a) have fine serrations (18) and the greater-diameter reducing discs (14a) have coarse serrations (17) and wherein the reducing discs (13a) with fine serrations (18) have a diameter smaller than the reducing discs (14a) with coarse serrations (17).

2. A roller-type reducing apparatus as in claim 1 wherein the reducing discs (14a) with coarse serrations (17) and the reducing discs (13a) with fine serrations (18) form integral reducing rollers (13, 14), said reducing rollers (13, 14) being mutually axially offset in such a manner that the reducing discs (14a) with coarse serrations (17) rotate in an opposite direction from the reducing discs (13) with fine serrations (18).

3. A roller-type reducing apparatus as in claim 2, wherein the reducing rollers (13, 14) are placed face to face with an intervening variable-width reducing gap (19).

4. A roller-type reducing apparatus as in claim 3 wherein the reducing gap (19) extends in zigzag fashion and has at the flanks of the serrations dimensions similar to or smaller than in the head portions of the reducing discs (13a, 14a).

5. A roller-type reducing apparatus as in claim 1, wherein the serrations (17, 18) have trapezoidal tapers (23).

6. A roller-type reducing apparatus as in claim 1 wherein the reducing rollers (13, 14) are rotatable in opposite directions with different speeds by independent speed-regulating drives wherein the speeds of the oppositely rotating reducing rollers (13, 14) are independently variable.

7. A roller-type reducing apparatus as in claim 1 wherein the reducing rollers (13, 14) have stationary relocating means (26) associated therewith.

* * * * *